June 3, 1941.  W. V. THELANDER  2,244,134

CLUTCH PLATE

Filed Feb. 10, 1938  3 Sheets-Sheet 1

Inventor:
W. Vincent Thelander
By
McCanna, Wintercorn & Morsbach
Attys.

Patented June 3, 1941

2,244,134

UNITED STATES PATENT OFFICE 2,244,134

CLUTCH PLATE

W. Vincent Thelander, Rockford, Ill.

Application February 10, 1938, Serial No. 189,817

49 Claims. (Cl. 192—68)

This invention relates to clutches for motor vehicles, and is particularly concerned with an improved clutch plate.

I am aware that many different constructions have been proposed for spring cushioned clutch plates with a view to damping vibrations. However, most of the constructions designed have been subject to the objections that they are too complicated and expensive. It is therefore one of the principal objects of my invention to provide a clutch plate of simpler and more practical construction in which the springs are assembled inside struck out or embossed pockets on the plate, whereby to obtain not only a simple and economical construction but one that is superior to previous constructions from the standpoint of having the springs completely enclosed for protection and better appearance, and from the standpoint that there is nothing that is apt to work loose and be thrown off in the operation of the clutch at high speeds.

A special feature of my improved clutch plate is the provision of two sets of springs, two in each pocket, a lighter spring to give "soft" cushioning action, and a heavier spring to assume the actual torque load, the two springs cooperating with a thrust member in such a way that the lighter spring is compressible only a certain amount before the thrust member transmits the torque to the heavier spring. This thrust member is so related to the relatively rotatable inner and outer portions of the plate that the lighter spring is permitted to play a more prominent part in the coasting operation when a lighter spring reaction is desired.

Another important object of my invention is to provide a clutch plate built up from a multiplicity of identical, interchangeable, sheet metal stampings, individually of such small size with relation to the size of a whole plate that an appreciable saving in cost of manufacture is realized where the pieces are stamped from regular sheet stock, because of the greatly diminished amount of waste, although a proportionately greater saving in cost is made possible because the individual pieces are small enough to permit using scrap left over from the production of other sheet metal articles.

Still another object of the invention is to provide a clutch plate constructed along the lines described wherein provision is made in a novel manner for exerting a desired amount of frictional drag on the oscillation of the outer portion relative to the inner portion.

A further object consists in the provision of specially slotted and formed marginal mat holding portions on the plate, whereby to obtain the desired amount of compressibility in this portion of the plate engaged between the flywheel and pressure plate, so as to make for smoother clutch engagement.

These and other objects of the invention will appear in the course of the following detailed description in which reference is made to the accompanying drawings, wherein—

Figure 1:
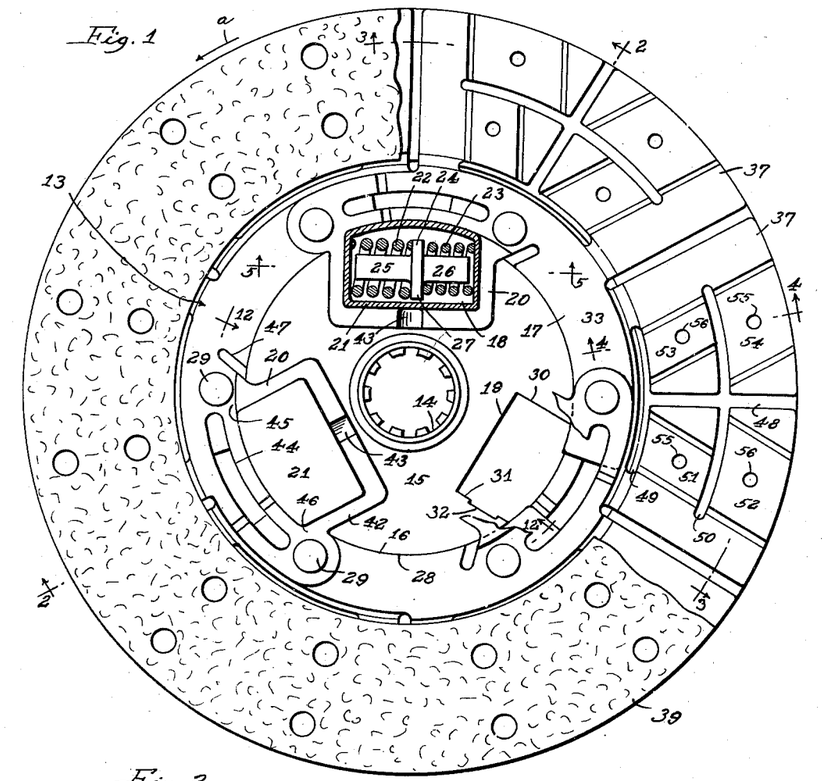
Figure 1 is a face view of a clutch plate made in accordance with my invention, showing one of the spring pockets in outside elevation, a second in longitudinal section, and a third broken away to show the registering notch in the center hub flange, there being also a portion of the friction mat broken away to show the slotting and bending of the marginal portion of the plate for "mush" effect.
Figure 2:
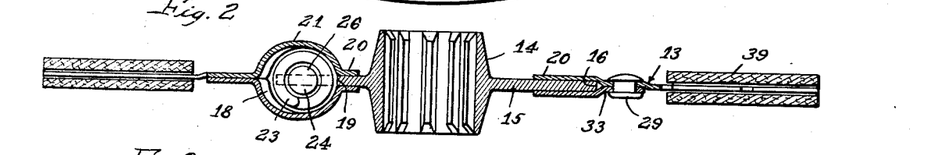
Fig. 2 is a cross-section on the broken line 2—2 of Fig. 1.

Referring first mainly to Figs. 1 and 2, the clutch plate 13 comprises relatively rotatable inner and outer portions, the inner portion being formed by a center hub 14 splined for driving connection with the driving shaft of the transmission and provided with an annular flange 15 onto which the outer portion of the plate is adapted to be assembled in engagement with the circular periphery 16 of the flange. The outer portion in accordance with my invention may be made up of an even number of sections 17, six being shown in the present case, three facing one way and the other three facing the other way. With this number of sections, I provide three spring pockets 18 for cooperation with three registering notches 19 in the flange 15, because each section has an ear 20 overlying one side of the flange 15 and formed to provide therein a struck out or embossed portion 21, of substantially semi-cylindrical form to form half of a pocket. The pockets 18 form housings for the spring cushioning means which, according to the present invention, consist of a set of heavy coiled compression springs 22, a set of light coiled compression springs 23, and intermediate thrust members 24. Each pocket contains one heavy spring 22 and one light spring 23 with a thrust member 24 therebetween, the latter having stems 25 and 26 on opposite sides of an intermediate annular flange 27, the stems being entered in the springs, while the flange provides abutments on its opposite sides for the two springs.

It should be clear from this much description that the hub 14 bearing with its circular periphery 16 on the arcuate inner periphery 28 of the plate sections 17 is kept centered in relation to the plate, while the ears 20 engaging the flange 15 on opposite sides hold the hub against axial displacement when the plate sections are riveted together, as at 29, at points in circumferentially spaced relation relative to the plate. The spring cushioning means 22—24 housed in the pockets 18 are concealed and retained between their related plate sections in operative relation to the opposite ends 30 and 31 of the correlated notches 19. In that way, the ends 30 form driving faces when the drive is from the plate 13 to the hub 14 and the clutch is engaged to drive the plate 13 in a counter-clockwise direction, as indicated by the small arrow a in Fig. 1. The ends 31 form driving faces when the drive is from the hub 14 to the plate 13, as in coasting. Manifestly, the construction is simple, compact and economical, and the spring cushioning means is completely enclosed and no extraneous means is required to hold the same in position as in certain prior constructions with which I am familiar. There is no danger of certain parts becoming displaced under centrifugal force when the clutch operates at high speeds.

The operation of the spring cushioning means 22—24 will be best understood by reference to Figs. 1 and 5 to 8. The heavier spring 22 in each pocket 18 bears against the end 30 of the notch 19, and the lighter spring 23 is subjected to compression by the opposite end of the pocket 18, as torque is applied to the plate 13 in the direction of the arrow a, Figs. 1 and 7. Since the spring 23 is lighter than the spring 22, the spring 23 will compress while spring 22 remains practically rigid, thus giving a soft cushioning action. Now, the spring 23 can be compressed only until the end wall of the pocket 18 encounters the end of the stem 26 whereupon any further relative movement between the plate 13 and hub 14 must be secured by compression of the heavier spring 22 through the intermediary of the thrust member 24. This is where the actual heavy torque load is assumed, and hence the lighter springs 23 are not subjected to undue compression, but are automatically eliminated from the operation when the thrust members 24 come into play. It will also be seen that the thrust members 24 provide a definite positive limit to the compression of the springs 22 when the ends of the stems 25 come into engagement with the ends 30 of the notches 19, thus protecting the spring cushioning means from too great compression and adding greatly to the life of the clutch plate by decreasing the likelihood of spring breakage. Now, assuming that the car coasts and the drive condition is reversed, the drive being from the hub 14 to the plate 13: Under those conditions, illustrated in Fig. 8, the end 31 of each notch 19 bears against the adjacent end of the spring 23, while the heavier spring 22 bears against the remote end of the pocket 18 in the plate to transmit drive from the hub to the plate. Obviously, the light springs 23 compress readily and therefore give a softer cushioning action than if the springs 22 were used. It will be noticed that the ends 31 are recessed, as at 32, to accommodate the end of the stem 26 and thus allow the spring 23 to be subjected to a further degree of compression than is permitted during normal driving when the adjacent end of the pocket 18 compresses the spring 23. In that way, the light springs 23 are permitted to play a more prominent part during coasting, under which conditions a softer spring reaction or cushioning effect is desired than under normal driving conditions.

Figures 11, 12, 13:
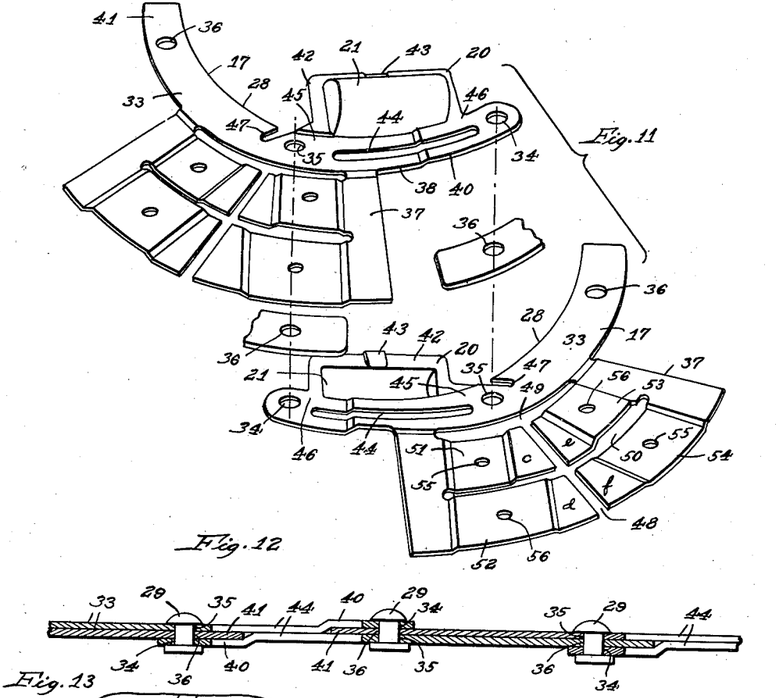
Fig. 11 is a perspective view of a group of stampings disposed in spaced relation but with rivet holes in vertical alignment so as to indicate the mode of assembly of my improved plate.
Fig. 12 is a developed section of the final assembly taken on the arcuate line 12—12 of Fig. 1.
Fig. 13 is a fragmentary elevational detail of the central portion of a clutch plate of my invention, showing a different construction for obtaining the desired frictional drag.

The mode of assembling the multi-section plate using the six stamped sheet metal plate sections 17 can be best understood by reference to Figs. 1, 2, 11 and 12. The ear 20 from which the semi-cylindrical pocket part 21 is struck extends approximately half the length of the arcuate body 33 of each plate section 17, and is disposed between two rivet holes holes 34 and 35 on that half of the body. A third rivet hole 36 is in the other end of the body. The ear 20 projects radially inwardly from the inner arcuate edge 28 of the body, and there is a segmental-shaped larger ear 37 projecting radially from the outer arcuate edge 38 of the body at the middle thereof, the ear 37 being symmetrical with respect to the middle rivet hole 35, as shown. The ears 37 on the correlated plate sections in the assembled plate 13 provide an annular mat support for application of the annular facings 39 of suitable composition material, usually containing asbestos. The main body portion 33 of each plate section is in one plane except for the small end portion 40 struck out of the plane of the body portion an amount equivalent to the thickness of a plate section, so that when two plate sections are placed face to face, there is enough space left therebetween for the free end 41 of the third section, as indicated in Fig. 12. In fact, each of the rivets 29 for fastening the plate sections together passes through registering holes in three overlapping sections. The three sections on the one face of the plate are overlapped at adjoining ends so that the rivet hole 34 in one section registers with the rivet hole 36 in the next section, and so on. The same is true on the other face of the plate, but, of course, the plate sections on that face are reversed end for end and shifted angularly enough to bring the ears 20 on the two faces of the plate in register to form the pockets 18. In that way, the rivet holes 34 and 36 of one set of plate sections register with the intermediate rivet holes 35 in the other set, as clearly appears in Figs. 11 and 12. In passing, it will also be observed that the ears 20 are struck out of the plane of the main body portion 33 approximately the same plane with the offset end portions 40, whereas the ears 37 are struck out of the plane of the main body portion 33 in the opposite direction to the same extent. Thus, when the plate sections are assembled together in the manner described, all of the ears 20 of one set are in one plane coincident with the plane of one face of the flange 15, and the ears 20 of the other set are in another plane coincident with the plane of the other face of the flange 15, while the ears 37 of both sets are all disposed in one plane approximately midway between the two planes aforesaid, all as most clearly appears in Fig. 2. The interchangeability of the plate sections makes for quick and easy assembling of these clutch plates, and also is an important factor in reducing cost because of the saving in die costs thereby realized. The fact that each plate section represents approximately one-sixth of a whole plate, means that the individual section can be produced from such a small piece of sheet metal that scrap from the production of other sheet metal articles may be used and a great saving in cost thereby effected. The small size and the particular shape of the individual plate sections also permits stamping the same from regular sheet stock with very little waste—much less than is necessarily involved where a whole plate is punched out—and there is accordingly an appreciable saving in cost even where ordinary methods of production are followed.

Attention is now called to the fact that each of the ears 20 provides a broad marginal reenforcing flange 42 around the pocket portion 21 parallel to the adjacent face of the hub flange 15. Each of these flanges 42 has a friction pad portion 43 struck inwardly therefrom to frictionally engage the adjacent face of the hub flange 15 to resist relative movement between the plate 13 and hub 14 which according to present practice is considered desirable in all spring cushioned clutch plates. Now, of course, the friction pads 43 cause the ears 20 to be deflected slightly away from the flange 15, and the inherent resilience of the sheet metal employed in the plate sections is counted upon to keep the pads 43 held with substantially uniform pressure in engagement with the flange 15. I prefer to arcuately slot each of the plate sections lengthwise of the main body portion 33, as at 44, between the rivet holes 34 and 35 directly behind the ears 20, so that the ears will be tensioned only by the small widths of metal at 45 and 46, joining the inner corners of the ears to the body portions. By further slotting the body portions 33, as at 47, adjacent the connecting webs 45, I assure even tension on the ears at both ends. It is obvious from this description that when the plate sections are riveted together, the spring tension is automatically built into the plate to assure proper frictional engagement of the six friction pads 43 with the flange 15 to resist relative movement between the plate 13 and hub 14. There being three friction pads working on both sides of the flange 15 directly opposite one another, the best results are obtained, and since each pair of related friction pads are placed under tension by the upsetting of one and the same pair of rivets, it follows that the pressure on opposite sides of the flange at each of the three equally circumferentially spaced points will be substantially the same.

Figure 9:
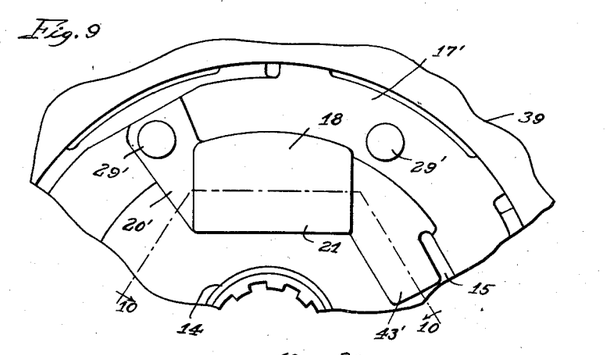
Fig. 9 is a fragmentary elevational detail showing a slightly modified or alternative construction of clutch plate.
Figure 10:
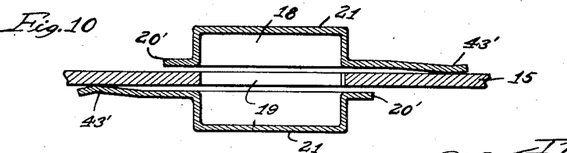
Fig. 10 is a section on the broken line 10—10 of Fig. 9.
Figure 14:
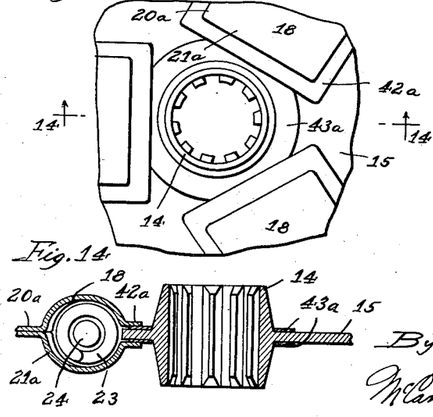
Fig. 14 is a section on the line 14—14 of Fig. 13.

In lieu of the friction pads 43, I may provide spring fingers 43' projecting from the ears 20' to rub on the flange 15 in the spaces between the spring pockets 18, as disclosed in Figs. 9 and 10, or, as shown in Figs. 13 and 14, I may provide plain flat flanges 42a on the pockets 21a and insert thin flat friction rings 43a under the flanges so as to rub on one face against the hub flange 15 and on the other face against the flanges 42a, while kept centered by the hub 14. The fingers 43', as indicated in Fig. 10, serve to hold the ears 20' in slightly spaced relation to the flange 15, and are caused to rub on the flange under spring tension of the ears 20' when the rivets 29' fasten the plate sections 17' together. The rings 43a, on the other hand, place the ears 20a under tension by holding the flanges 42a spaced from the hub flange 15, and the rings, while being rubbed between these parts, will shift their positions rotatably and thus wear substantially uniformly. The rings 43a may be of fibre, brass, or any other material suitable for the purpose. The results obtainable with either of these constructions are similar to what is obtained with the first described construction.

Figure 3:
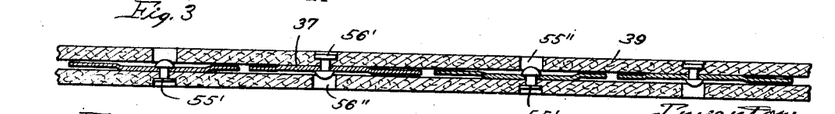
Fig. 3 is a developed sectional detail on the arcuate line 3—3 of Fig. 1.
Figure 4:
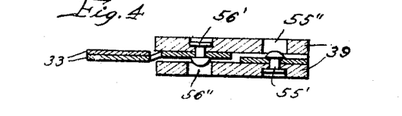
Fig. 4 is a sectional detail on the radial line 4—4 of Fig. 1.
Figure 5:
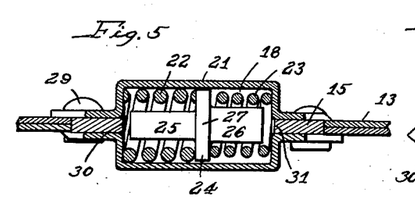
Fig. 5 is a sectional detail on the line 5—5 of Fig. 1.
Figure 6:
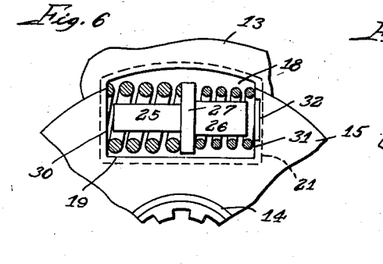
Figs. 6 to 8 are more or less diagrammatic views to illustrate the functioning of the spring cushioning means, the same being shown in a state of equilibrium in Fig. 6, under conditions when driving torque is applied in Fig. 7, and under coasting conditions in Fig. 8.
Figure 7:
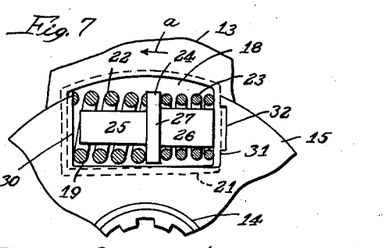
Figure 8:
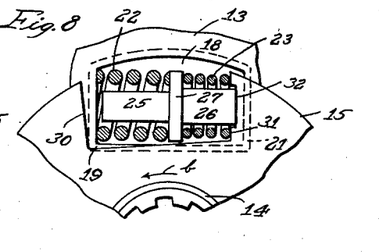

In conclusion, attention is called to the way in which the ears 37 for supporting the facings 39 are slotted radially substantially through the middle thereof, as indicated at 48, intersecting two arcuate concentric slots 49 and 50, the former at the junction between the ear 37 and the main body portion 33 and the other midway to the outer periphery of the ear. In this way, two pairs of lugs c, d, e, and f are formed on each ear, extending circumferentially toward one another from the opposed lateral edges of the ear. The inner lug c of one pair has an intermediate portion thereof struck out of the plane of the ear 37 in one direction, as at 51, while the other lug d of the same pair has an intermediate portion struck from the plane of the ear 37 in the opposite direction, as at 52. The two other lugs e and f also have intermediate portions struck therefrom in opposite directions, but in the reverse order from the other pair, so that the struck out portion 53 of the lug e is in the same plane with the struck out portion 52 of the lug d, and the struck out portion 54 of the lug f is in the same plane with the struck out portion 51 of the lug c. Rivet holes 55 are provided in the centers of the portions 51 and 54 to receive rivets 55' for fastening one of the facings 39 to the plate on one side thereof, while rivet holes 56 in the other portions 52 and 53 are adapted to receive rivets 56' for fastening the other facing 39 on the other side of the plate. In the case of each of the facings 39, there are regular rivet holes for the rivets 55' or 56', as the case may be, and other holes freely receiving the heads of the rivets associated with the other facing. In other words, holes 55'' in the one facing accommodate the heads of the rivets 55', and holes 56'' in the other facing accommodate the heads of the other rivets 56', as shown in Figs. 3 and 4. In that way, the desired "mush" effect is obtained when the clutch is engaged and the facings 39 are engaged from opposite sides by the flywheel and pressure plate, tending to force the struck out portions 51—54 of all of the plate sections into a common plane.

It is believed the foregoing description conveys a good understanding of the objects and advantages of my invention. The appended claims have been drawn with a view to covering all legitimate modifications and adaptations.

I claim:

1. A clutch plate comprising a center hub, a plurality of clutch plate sections circumferentially arranged around the hub, some of the sections engaging the hub on the front face thereof and some of said plate sections engaging the hub on the rear face thereof whereby to hold the hub against axial displacement with respect to said plate sections, and means for securing the plate sections together forming an annulus substantially in concentric relation with the hub.

2. A clutch plate comprising a center hub having an annular flange, a plurality of plate sections circumferentially arranged around the flange, some of the plate sections having portions abutting the front face of the flange and some of the plate sections having portions abutting the rear face of the flange to hold the hub against axial displacement with respect to said plate sections, means for securing the plate sections together to form an annulus substantially concentric with the hub, spring means active between the flange and the portions of said plate sections abutting the same for resiliently transmitting drive between the annulus and hub, and rings of friction material supported on opposite sides of the annulus in substantially concentric relation with the hub and secured to all of said plate sections.

3. A clutch plate comprising a center hub having an annular flange formed to provide a plurality of circumferentially spaced cut-out portions defining driving faces at opposite ends thereof in circumferentially spaced relation, a plurality of plate sections circumferentially arranged around the flange and constructed to overlap the front and rear faces thereof to hold the hub against axial displacement with respect to the plate sections, the portions of said plate sections overlapping the flange being further formed to provide pockets in register with the cut-out portions in the flange, the opposite ends of the pockets also defining driving faces, spring means enclosed in said pockets for engagement at one end with a drive face on the flange and at the other end with a drive face in the pockets, said spring means being adapted to be assembled in the pockets and cut-out portions prior to the fastening together of the plate sections, and means for fastening the plate sections together forming an annulus in substantially concentric relation with the hub.

4. A clutch plate as set forth in claim 3, wherein the plate sections are of resilient sheet metal, one or more of the portions of said plate sections overlapping the hub flange being formed to provide a friction pad held resiliently in frictional engagement with the flange under spring tension of the overlapping portions, said portions being placed under tension in the fastening together of the plate sections.

5. A clutch plate comprising a center hub, two series of clutch plate sections each having the sections circumferentially arranged with respect to the hub, one series having portions on the plate sections overlapping the front face of the hub and the other series having portions of the plate sections overlapping the rear face of the hub to hold the hub against axial displacement with respect to the plate sections, means for securing the two series of plate sections together forming an annulus, and rings of friction material mounted on opposite sides of said annulus and attached to all of the plate sections.

6. A clutch plate comprising a center hub having an annular flange formed to provide a plurality of circumferentially spaced cut-out portions defining driving faces at opposite ends thereof in circumferentially spaced relation, two series of clutch plate sections each having the sections circumferentially arranged with respect to the hub, one series having portions of the plate sections overlapping the front face of the flange and the other series having portions of the plate sections overlapping the rear face of the flange, the portions of said plate sections overlapping the flange being formed to provide pockets in register with the cut-out portions in the flange and defining therein drive faces at opposite ends thereof, spring cushioning means enclosed in said pockets and arranged to engage the driving face at one end of the cut-out portions in the flange and the driving faces at the other ends of the pockets, the spring cushioning means being adapted to be inserted in the pockets prior to the fastening together of the two series of plate sections, and means for fastening the two series of plate sections together, forming an annulus adapted to support friction facing material.

7. A clutch plate as set forth in claim 6, wherein all of the plate sections are of identical form and mutually interchangeable and adapted to be assembled in either of the two series.

8. In a clutch plate, a plurality of clutch plate sections each formed from a single piece of sheet metal to provide a main body portion of arcuate form having a segmental-shaped portion projecting radially from the outer periphery and having another portion projecting from the inner periphery, a hub having a flange, the plate sections being arranged with the body portions thereof disposed circumferentially with respect to the periphery of said flange, some of the plate sections having their inner portions overlying one face of the flange and some of the plate sections having their inner portions overlying the opposite face of the flange to retain the hub in assembled relation with the plate sections when the latter are fastened together, means for fastening the plate sections together forming a complete annulus around the flange, the segmental-shaped outer portions of the plate sections together forming an annular support, and rings of friction material mounted on opposite sides thereof and secured to all of said segmental portions.

9. In a clutch plate, a plurality of clutch plate sections each formed from a single piece of sheet metal to provide a main body portion of arcuate form having a segmental-shaped portion projecting radially from the outer periphery and having another portion projecting from the inner periphery, a hub having a flange, the plate sections being arranged with the body portions thereof disposed circumferentially with respect to the periphery of said flange, one set of the plate sections having their inner portions abutting one face of the flange and a second set of plate sections having their inner portions abutting the opposite face of the flange, whereby to hold the hub in assembled relation to the plate sections when they are fastened together, means for fastening the two sets of plate sections together, the outer segmental-shaped portions of each set of plate sections being in uniformly circumferentially spaced relation, and the two sets of plate sections being angularly offset with relation to one another so that the segmental-shaped portions of the two sets jointly form an annular support with the segmental-shaped portions of one set alternating with the segmental-shaped portions of the other set, and rings of friction material applied to opposite faces of said annular support and fastened to all of said segmental-shaped portions.

10. A clutch plate as set forth in claim 9, wherein the flange on the hub has cut-out portions covered by the inner portions of the plate sections, the inner portions of said plate sections being formed to provide pockets, and the clutch plate including spring means enclosed in said pockets and received in the cut-out portions of the flange for yieldingly transmitting drive between the plate sections and flange, said spring means being adapted to be inserted in the cut-out portions and pockets prior to the fastening together of the two sets of plate sections.

11. As an article of manufacture, a clutch plate section comprising a flat generally arcuate sheet metal body adapted to be assembled in concentric relation to a center hub for a clutch plate, said body having projecting substantially radially from the outer periphery thereof a segmental-shaped portion adapted to serve as a clutch facing support, and having projecting substantially radially from its inner periphery an ear portion formed to provide a substantially semi-cylindrical pocket, the longitudinal axis of which is transverse to a radius of said body extended from the center of the center hub.

12. As an article of manufacture, a clutch plate section comprising a flat generally arcuate sheet metal body adapted to be assembled in concentric relation to a center hub for a clutch plate, said body having three equidistantly spaced rivet holes provided therein, two at opposite ends and the third at the middle thereof, said body having projecting substantially radially from the outer periphery and in substantially symmetrical relation to the middle rivet hole a segmental-shaped portion adapted to serve as a clutch facing support, and said body having projecting from its inner periphery between the middle hole and one end hole an ear portion formed to provide a substantially semi-cylindrical pocket, the longitudinal axis of which is transverse to a radius of said body extended from the center of the center hub.

13. An article as set forth in claim 12, wherein the ear is formed on its inner edge to provide a protruding friction pad portion, and wherein the body portion is formed to provide behind the ear an arcuate slot substantially concentric with said body and extending substantially the full length of the ear from a point adjacent the middle rivet hole to a point adjacent the related end rivet hole.

14. As an article of manufacture, a sheet metal clutch plate section formed to provide an arcuate body portion with an included angle of approximately 120° adapted to be assembled in concentric relation to a center hub for a clutch plate, the body portion having projecting substantially radially from its outer periphery a segmental-shaped ear having an included angle of approximately 60° adapted to serve as a clutch facing support, and said body having projecting substantially radially from its inner periphery an elongated ear portion, the long dimension of which is transverse to a radius of said body extended from the center of the center hub, the latter ear having at least a portion thereof struck out to provide a pocket lengthwise thereof adapted to receive a coiled compression spring.

15. As an article of manufacture, a sheet metal clutch plate section formed to provide an arcuate body portion with an included angle of approximately 120° adapted to be assembled in concentric relation to a center hub for a clutch plate, the body portion having projecting substantially radially from its outer periphery a segmental-shaped ear having an included angle of approximately 60° adapted to serve as a clutch facing support, and said body having projecting substantially radially from its inner periphery an elongated ear portion, the long dimension of which is transverse to a radius of said body extended from the center of the center hub, the latter ear having at least a portion thereof struck out to provide a pocket lengthwise thereof adapted to receive a coiled compression spring, one end portion of the arcuate body being bent in one direction into offset but substantially parallel relation to the rest of the body portion, and the inner ear portion being also bent out of the plane of said body portion in the same direction as said end portion and so that the inner face of the offset end portion and the inner face of the last named ear portion are in substantially the same plane.

16. As an article of manufacture, a sheet metal clutch plate section formed to provide an arcuate body portion with an included angle of approximately 120° adapted to be assembled in concentric relation to a center hub for a clutch plate, the body portion having projecting substantially radially from its outer periphery a segmental-shaped ear having an included angle of approximately 60° adapted to serve as a clutch facing support, and said body having projecting substantially radially from its inner periphery an elongated ear portion, the long dimension of which is transverse to a radius of said body extended from the center of the center hub, the latter ear having at least a portion thereof struck out to provide a pocket lengthwise thereof adapted to receive a coiled compression spring, the segmental-shaped ear being bent in one direction into offset but substantially parallel relation to the body portion and the other ear portion being bent in the opposite direction into offset but substantially parallel relation to the plane of the body portion.

17. In a clutch disk comprising relatively rotatable inner and outer portions, and means providing abutments on said inner and outer portions, spring cushioning means cooperating with said abutments for resiliently resisting relative rotation, said means comprising a relatively heavy coiled spring, a relatively light coiled spring and an intermediate thrust member so arranged with respect to the heavy and light springs to permit, upon relative movement between the inner and outer portions, first a predetermined amount of compression of the light spring in the movement of its cooperating abutment relative to the other abutment until said abutment positively engages the thrust member, whereupon the thrust member in moving with the aforesaid abutment compresses only the heavy spring in the further movement of said abutment relative to the other abutment.

18. In a clutch disk comprising relatively rotatable inner and outer portions, and means providing abutments on said inner and outer portions, spring cushioning means cooperating with said abutments for resiliently resisting relative rotation, said means comprising a relatively heavy coiled spring, a relatively light coiled spring and an intermediate thrust member so arranged with respect to the heavy and light springs to permit, upon relative movement between the inner and outer portions, first a predetermined amount of compression of the light spring in the movement of its cooperating abutment relative to the other abutment until said abutment positively engages the thrust member, whereupon the thrust member in moving with the aforesaid abutment compresses only the heavy spring in the further movement of said abutment relative to the other abutment, said thrust member being arranged in the event of extreme movement of the one abutment relative to the other to provide positive drive by engagement at opposite ends with the two abutments.

19. A clutch plate comprising, in combination, a center hub having a flange formed to provide a notch in the periphery thereof defining drive faces at opposite ends thereof in circumferentially spaced relation, a clutch plate body formed to provide a pocket enclosing the notched portion of the flange and defining driving faces in the opposite ends thereof, and spring cushioning means enclosed in said pocket for resiliently transmitting drive between the hub and plate body by engagement at one end with the drive face in one end of the notch and engagement at the other end with the drive face at the opposite end of the pocket, said spring cushioning means comprising a relatively light coiled compression spring, a relatively heavy coiled compression spring and a positive thrust member therebetween engageable with either end of the notch upon relative endwise movement, the two springs being adapted under conditions of equilibrium to engage the drive faces on the flange and pocket, said light spring upon relative rotation between the hub and plate body in one direction being arranged to be compressed by engagement of the driving face on the adjacent end of the pocket while the heavy spring engages and resiliently transmits drive to the driving face on the respectively opposite end of the notch in the flange, said thrust member after predetermined compression of the light spring being engaged by the same driving face and serving thereafter to move positively with said driving face to apply compression solely to the heavy spring.

20. A clutch plate as set forth in claim 19, wherein the thrust member is adapted to engage the driving face engaged by the heavy spring under extreme relative movement between the plate body and hub, whereby to provide positive drive.

21. A clutch plate as set forth in claim 19, wherein the driving face in the end of the notch in the flange and the adjacent end of the thrust member are so formed relative to one another as to permit of greater compression of the light spring when the drive is in the opposite direction, as for example when the plate body lags with respect to the hub.

22. In a clutch disk, comprising a body having a plurality of segmental-shaped ears projecting radially therefrom in circumferentially spaced relation forming an annular support for mounting rings of friction material thereon, each of said segmental-shaped ears being slotted radially intermediately thereof and arcuately substantially concentrically through an intermediate portion and inner portion thereof so as to define four arcuate lugs in two pairs extending circumferentially in opposite directions, one lug of each pair having a central portion thereof struck out of the plane of the ear in one direction into a plane substantially parallel to the plane of the ear and the other lug of each pair having a central portion thereof struck out of the plane of the ear in the opposite direction into a plane substantially parallel to the plane of the ear, said struck-out central portions providing yieldable supporting means for the rings of friction material and being perforated, and opposed rings of friction material mounted on the aforesaid annular support by fastening means extending through the last-named perforations, said rings of friction material being normally disposed in a predetermined spaced relation resting in engagement with said yieldable struck-out portions and being movable toward one another upon engagement of the clutch as permitted by the yield of said struck-out portions.

23. In a friction clutch plate, the combination of a hub member, a relatively rotatable plate member comprising sections adapted to be assembled together from opposite sides of said hub member so as to hold the latter therebetween, at least one of said sections having a resilient frictional pad portion integral therewith for engaging said hub member to frictionally resist relative rotation between the plate and hub members, said pad portion being adapted to be placed under operating tension when the plate sections are forced together into assembled relation, means for fastening said plate sections together so as to keep said pad portion tensioned, and spring means loaded upon relative rotation of said plate member relative to said hub member.

24. In a friction clutch plate, the combination of a hub member having a circular flange concentric therewith, a relatively rotatable plate member comprising sections carrying friction facings on the radially outer portions thereof and adapted to be assembled together at their radially inner portions from opposite sides of said flange so as to hold the hub member therebetween, a resilient frictional brake comprising spring members projecting from the plate sections and slidably engaging the side of said flange and cooperating with the plate and hub members to frictionally resist rotation therebetween, said spring members being adapted to be placed under operating tension when the inner portions of said plate sections are forced together into assembled relation, means for fastening the inner portions of said plate sections together so as to keep said spring members tensioned, and spring means loaded upon relative rotation of said plate member relative to said hub member.

25. In a friction clutch plate, comprising a hub member having an annular flange, a built-up, sectional plate member comprising segmental sections carrying frictional facings on the radially outer portions thereof and adapted to be assembled together at their radially inner portions circumferentially arranged on opposite sides of said flange, each segmental plate section having the inner portion thereof of elongated arcuate form and having the outer portion projecting radially from substantially the middle thereof, the sections being adapted to be assembled so that the arcuate inner portions complete two rings whereas the radially disposed outer portions of the one set of sections are disposed in circumferentially spaced relation between the circumferentially spaced radial outer portions of the other set of sections and thereby complete a single ring for mounting of frictional facings on the opposite sides thereof, and means for fastening the inner portions of said sections together so as to form a circular plate from the segmental sections and retain the hub by its flange.

26. In a friction clutch plate, comprising a hub member having an annular flange, a built-up, sectional plate member comprising a plurality of segmental plate sections carrying friction facings on the radially outer portions thereof and adapted to be assembled together at their radially inner portions from opposite sides of the flange and be fastened together so as to retain the hub by its flange, each plate section having a spring-pressed portion engaging the flange to frictionally resist relative rotation between the plate and hub, the spring-pressed portions being adapted to be placed under tension toward tight engagement with the flange when the plate sections are forced together into assembled relation, and means for fastening the inner portions of said plate sections together in such relation.

27. A clutch disk comprising a hub having an annular flange, said flange having an opening provided therein elongated circumferentially with respect to the flange, plates in face to face abutment in a plane substantially parallel with the flange having portions on the inner edges thereof formed to provide recesses therein also elongated circumferentially with respect to the flange and registering with the opening in the latter on opposite sides of the flange, whereby to provide a pocket adapted to receive spring cushioning means, spring cushioning means disposed in said pocket yieldingly resisting relative rotation between the hub and plates, means for securing the plates together near their inner edges, the outer marginal portions of said plates forming jointly a single annular support for friction facings, and friction material carried on the opposite faces of said support.

28. A clutch disk comprising a hub having an annular flange, said flange having a plurality of openings in circumferentially spaced relation provided therein elongated circumferentially with respect to the flange, annular disk sections in face to face abutment in a plane substantially parallel with the flange, said disk sections having portions on their inner edges formed to provide recesses in register with the aforesaid openings on opposite sides of the flange, said recesses being also elongated circumferentially with respect to the flange, the openings and registering recesses forming pockets adapted to receive spring cushioning means, spring cushioning means in said pockets yieldingly resisting relative rotation between the hub and disk sections, means for securing the disk sections together near their inner edges, one of said disk sections providing circumferentially spaced outer marginal portions in alternate relation to circumferentially spaced outer marginal portions on the other disk section, and annularly extending friction material on opposite sides of the disk secured to the outer portions of both disk sections.

29. A clutch plate comprising a center hub having an annular flange, a plurality of plate sections circumferentially arranged around the flange, some of said plate sections having portions projecting in front of said flange and some of said plate sections having portions projecting behind said flange, means for securing said plate sections together to form an annulus substantially concentric with the hub while retaining said hub against axial displacement by means of said projections, said annulus being rotatable relative to said hub, spring means for resiliently transmitting drive between the annulus and hub, and one or more friction rings rotatable relative to said hub and annulus encircling the hub and held tightly between the hub flange and projections, to rub on one face against the flange and on the other face against the projections.

30. In a friction clutch plate, the combination of a hub member having a flange with a spring opening therein, a relatively rotatable plate member having a spring pocket portion projecting over the flange with the pocket in register with the opening, spring cushioning means disposed in said opening and pocket to transmit torque resiliently between the plate and hub members, and a friction ring on said hub held frictionally engaged between the flange and pocket portion to resist relative rotation between the plate and hub members.

31. A clutch plate comprising a center hub having an annular flange, a plurality of plate sections circumferentially arranged around the flange, some of the plate sections having portions abutting the front face of the flange and some of the plate sections having portions abutting the rear face of the flange to hold the hub against axial displacement with respect to said plate sections, means for securing the plate sections together to form an annulus substantially concentric with the hub, and spring means active between the flange and the portions of said plate sections abutting the same for resiliently transmitting drive between the annulus and hub, said annulus being adapted to have friction material applied thereon.

32. A clutch plate comprising a center hub, two series of clutch plate sections each having the sections circumferentially arranged with respect to the hub, one series having portions on the plate sections overlapping the front face of the hub and the other series having portions of the plate sections overlapping the rear face of the hub to hold the hub against axial displacement with respect to the plate sections, and means for securing the two series of plate sections together forming an annulus, said annulus being adapted to have friction material applied thereon.

33. A clutch plate comprising a center hub, two series of clutch plate sections each having the sections circumferentially arranged with respect to the hub, one series having portions on the plate sections overlapping the front face of the hub and the other series having portions of the plate sections overlapping the rear face of the hub to hold the hub against axial displacement with respect to the plate sections, the clutch plate sections each having a radially projecting outer portion adapted for support of friction material, and means for securing the two series of plate sections together in angularly offset relation so that the outer portions of the plate sections of one series are alternately arranged with respect to the outer portions of the plate sections of the other series and said outer portions together form an annulus adapted to have friction material applied thereto.

34. In a clutch plate, a plurality of clutch plate sections each formed from a single piece of sheet metal to provide a main body portion of arcuate form having a segmental-shaped portion projecting radially from the outer periphery and having another portion projecting from the inner periphery, a hub having a flange, the plate sections being arranged with the body portions thereof disposed circumferentially with respect to the periphery of said flange, some of the plate sections having their inner portions overlying one face of the flange and some of the plate sections having their inner portions overlying the opposite face of the flange to retain the hub in assembled relation with the plate sections when the latter are fastened together, and means for fastening the plate sections together forming a complete annulus around the flange, said segmental-shaped outer portions of the plate sections together forming an annular support adapted to have friction material applied thereto.

35. In a clutch plate, a plurality of clutch plate sections each formed from a single piece of sheet metal to provide a main body portion of arcuate form having a segmental-shaped portion projecting radially from the outer periphery and having another portion projecting from the inner periphery, a hub having a flange, the plate sections being arranged with the body portions thereof disposed circumferentially with respect to the periphery of said flange, one set of the plate sections having their inner portions abutting one face of the flange and a second set of plate sections having their inner portions abutting the opposite face of the flange, whereby to hold the hub in assembled relation to the plate sections when they are fastened together, and means for fastening the two sets of plate sections together, the outer segmental-shaped portions of each set of plate sections being in uniformly circumferentially spaced relation, and the two sets of plate sections being angularly offset with relation to one another so that the segmental-shaped portions of the two sets jointly form an annular support with the segmental-shaped portions of one set alternating with the segmental-shaped portions of the other set, said annular support being adapted to have friction material applied thereto.

36. In a clutch disk comprising relatively rotatable inner and outer portions, and means providing abutments on said inner and outer portions, spring cushioning means cooperating with said abutments for resiliently resisting relative rotation between said inner and outer portions, said means comprising a relatively heavy spring, a relatively light spring, and a thrust member so arranged with respect to said springs and abutments to flex the heavy spring in the relative movement between the abutments after predetermined flexure of the light spring.

37. In a clutch disk comprising relatively rotatable inner and outer portions, and means providing abutments on said inner and outer portions, spring cushioning means cooperating with said abutments for resiliently resisting relative rotation between said inner and outer portions, said means comprising a relatively heavy spring, a relatively light spring, and a thrust member so arranged with respect to said springs and abutments to flex the heavy spring in the relative movement between the abutments after predetermined flexure of the light spring, said thrust member being arranged in the event of extreme movement of said abutments relative to one another to provide positive drive between the relatively rotatable inner and outer portions of said clutch disk.

38. In a clutch disk comprising relatively rotatable inner and outer portions, and means providing abutments on said inner and outer portions, spring cushioning means cooperating with said abutments for resiliently resisting relative rotation between said inner and outer portions, said means comprising a relatively heavy spring, a relatively light spring, and a thrust member so arranged with respect to said springs and abutments to flex the heavy spring in the relative movement between the abutments after predetermined flexure of the light spring, said thrust member and abutments being further so related to permit a greater degree of flexure of the light spring by the thrust member before flexure of the heavy spring when driving in one direction than when driving in the opposite direction.

39. In a clutch disk comprising relatively rotatable inner and outer portions, and means providing abutments on said inner and outer portions, spring cushioning means cooperating with said abutments for resiliently resisting relative rotation between said inner and outer portions, said means comprising a relatively heavy spring, a relatively light spring, and a thrust member so arranged with respect to said springs and abutments to flex the heavy spring in the relative movement between the abutments after predetermined flexure of the light spring, said thrust member and abutments being further so related to permit a greater degree of flexure of the light spring by the thrust member before flexure of the heavy spring when driving in one direction than when driving in the opposite direction, said thrust member being arranged in the event of extreme movement of said abutments relative to one another in either direction to provide positive drive between the relatively rotatable inner and outer portions of the clutch disk.

40. In a clutch disk comprising relatively rotatable inner and outer portions, and means providing abutments on said inner and outer portions, cushioning means cooperating with said abutments for resiliently resisting relative rotation, said means comprising a relatively heavily compressible medium, a relatively lightly compressible medium, and a thrust member so arranged with respect to said media and abutments to compress the heavily compressible medium in the relative movement between the abutments after predetermined compression of the lightly compressible medium.

41. In a clutch disk comprising relatively rotatable inner and outer portions, and means providing abutments on said inner and outer portions, cushioning means cooperating with said abutments for resiliently resisting relative rotation, said means comprising a relatively heavily compressible medium, a relatively lightly compressible medium, and a thrust member so arranged with respect to said media and abutments to compress the heavily compressible medium in the relative movement between the abutments after predetermined compression of the lightly compressible medium, said thrust member being arranged in the event of extreme movement of said abutments relative to one another to provide positive drive between the relatively rotatable inner and outer portions of said clutch disk.

42. In a clutch disk comprising relatively rotatable inner and outer portions, and means providing abutments on said inner and outer portions, cushioning means cooperating with said abutments for resiliently resisting relative rotation, said means comprising a relatively heavily compressible medium, a relatively lightly compressible medium, and a thrust member so arranged with respect to said media and abutments to compress the heavily compressible medium in the relative movement between the abutments after predetermined compression of the lightly compressible medium, said thrust member and abutments being further so related to permit a greater degree of compression of the lightly compressible medium by said thrust member before compression of the heavily compressible medium when driving in one direction than when driving in the opposite direction.

43. In a clutch disk comprising relatively rotatable inner and outer portions, and means providing abutments on said inner and outer portions, cushioning means cooperating with said abutments for resiliently resisting relative rotation, said means comprising a relatively heavily compressible medium, a relatively lightly compressible medium, and a thrust member so arranged with respect to said media and abutments to compress the heavily compressible medium in the relative movement between the abutments after predetermined compression of the lightly compressible medium, said thrust member and abutments being further so related to permit a greater degree of compression of the lightly compressible medium by said thrust member before compression of the heavily compressible medium when driving in one direction than when driving in the opposite direction, said thrust member being arranged in the event of extreme movement of said abutments relative to one another in either direction to provide positive drive between the relatively rotatable inner and outer portions of the clutch disk.

44. In a friction clutch plate, the combination of a hub member, a relatively rotatable plate member comprising sections adapted to be assembled together from opposite sides of said hub member so as to hold the latter therebetween, said sections having resilient frictional pad portions integral therewith in circumferentially spaced relation relative to the hub member for engagement with the latter to frictionally resist relative rotation between the plate and hub members, said pad portions being adapted to be placed under operating tension when the plate sections are forced together into assembled relation, means for fastening said plate sections together so as to keep said pad portions tensioned, and spring means loaded upon relative rotation of said plate member relative to said hub member.

45. In a friction clutch plate, the combination of a hub member, a relatively rotatable plate member comprising a plurality of clutch plate sections circumferentially arranged around the hub, some of the sections engaging the hub on the front face thereof and some of said plate sections engaging the hub on the rear face thereof whereby to hold the hub against axial displacement with respect to said plate sections, each of said plate sections having a resilient pad portion integral therewith to engage said hub member to frictionally resist relative rotation between the plate and hub members, said pad portions being adapted to be placed under operating tension when the plate sections are forced together into assembled relation, means for fastening the plate sections together so as to keep said pad portions tensioned, the assembled plate sections forming an annulus substantially concentric with the hub adapted to have friction material applied thereto, and spring means loaded upon relative rotation between the plate member and hub member.

46. In a clutch disk, comprising a body having a plurality of segmental-shaped ears projecting radially therefrom in circumferentially spaced relation forming an annular support for mounting friction material thereon, each of said segmental-shaped ears being slotted radially intermediately thereof and arcuately substantially concentrically through an intermediate portion and inner portion thereof so as to define four arcuate lugs in two pairs extending circumferentially in opposite directions, one lug of each pair being struck out of the plane of the ear in one direction into a plane substantially parallel to the plane of the ear, and the other lug of each pair being struck out of the plane of the ear in the opposite direction into a plane substantially parallel to the plane of the ear, said struck out portions providing yieldable supporting means for the friction material and being perforated, and friction material mounted on the aforesaid annular support by fastening means extending through said perforations, the friction material on opposite sides of the annular support being normally disposed in a predetermined spaced relation and being movable toward one another upon engagement of the clutch in which the struck out portions supporting the friction material are adapted to yield.

47. A clutch plate, comprising a hub having an annular flange, said flange having a plurality of openings provided therein in circumferentially spaced relation, a plurality of segmental-shaped plate sections circumferentially arranged relative to said flange having radially outer portions adapted to carry friction material and having radially inner portions formed to provide pockets registering with the openings in the flange on one side thereof, said plate sections also having circumferentially extending overlapping end portions radially between the inner and outer portions of said sections, the overlapping end portions having registering openings provided therein, other plate means on the other side of said flange portions formed to provide pockets registering with the openings in the flange, spring cushioning means disposed in said openings and housed within said pockets and yieldingly resisting relative rotation between the hub and plate sections, said plate means having circumferentially spaced openings registering with the registering openings in the aforesaid overlapped end portions of the plate sections, and means entered in said registering openings for securing the plate sections together and to said other plate means.

48. A clutch plate comprising a center hub, a plurality of clutch plate sections circumferentially arranged around the hub having overlapping end portions with registering openings provided therein, some of the sections engaging the hub on the front face thereof and some of the sections engaging the hub on the rear face thereof, whereby to hold the hub against axial displacement with respect to the plate sections, the plate sections engaging the rear face having their openings in register with openings provided in the plate sections engaging the front face, and means entered through the registering openings for securing the plate sections together forming an annulus substantially in concentric relation with the hub.

49. A clutch plate comprising a center hub, a plurality of clutch plate sections some of which are circumferentially arranged around the hub on the rear face thereof and having overlapping end portions provided with registering openings, the rest of said clutch plate sections being circumferentially arranged around the front face of the hub and having overlapping end portions provided with registering openings, all of said clutch plate sections having radially projecting outer portions for mounting friction material thereon, the plate sections on one face of said hub being offset angularly with respect to the plate sections on the other face of the hub, whereby the outer portions of the plate sections form a continuous annulus for mounting friction material on the clutch plate, and means entered through the registering openings serving to secure the plate sections on both faces together forming an annulus substantially concentric with the hub and holding the hub against axial displacement relative to the plate sections.

W. VINCENT THELANDER.